(12) United States Patent
Brar

(10) Patent No.: US 8,100,445 B1
(45) Date of Patent: Jan. 24, 2012

(54) PET LEASH AND WASTE PICK-UP DEVICE

(76) Inventor: BalBir S. Brar, Laguna Hills, CA (US)

( * ) Notice: Subject to any disclaimer, the term of this patent is extended or adjusted under 35 U.S.C. 154(b) by 922 days.

(21) Appl. No.: 12/122,235

(22) Filed: May 16, 2008

(51) Int. Cl.
*A01K 27/00* (2006.01)
*B65H 75/34* (2006.01)

(52) U.S. Cl. .......................................... 294/1.3; 119/796

(58) Field of Classification Search .................... 294/1.3, 294/1.4, 1.5; 119/161, 795, 796, 867; 242/384.7
See application file for complete search history.

(56) References Cited

U.S. PATENT DOCUMENTS

| | | | |
|---|---|---|---|
| 3,935,443 A * | 1/1976 | Simmons | 362/108 |
| 4,119,337 A | 10/1978 | Sherhandt | |
| 4,210,351 A | 7/1980 | Orofino | |
| 4,253,691 A | 3/1981 | Liu | |
| 4,368,907 A | 1/1983 | Ross | |
| 4,458,932 A | 7/1984 | Resch | |
| 4,466,647 A | 8/1984 | Spevak | |
| 4,477,111 A | 10/1984 | Crooks | |
| 4,529,236 A | 7/1985 | Vogt | |
| 4,555,132 A | 11/1985 | Takoushian | |
| 4,900,077 A | 2/1990 | Beck | |
| 5,039,148 A | 8/1991 | Brautovich | |
| 5,295,721 A | 3/1994 | Wu | |
| 5,320,393 A | 6/1994 | Cortinas | |
| 5,344,200 A | 9/1994 | Yoshioka | |
| 5,350,208 A | 9/1994 | Heinrichson | |
| 5,540,469 A * | 7/1996 | Albert | 294/1.4 |
| 5,628,537 A | 5/1997 | Kiemer | |
| 5,887,550 A | 3/1999 | Levine et al. | |
| 5,890,456 A * | 4/1999 | Tancrede | 119/794 |
| 6,039,370 A | 3/2000 | Dooley, Jr. et al. | |
| 6,076,717 A * | 6/2000 | Edwards et al. | 294/1.3 |
| 6,095,579 A | 8/2000 | Nichols | |
| 6,135,520 A | 10/2000 | Miller et al. | |
| D442,754 S | 5/2001 | Gregoire | |
| 6,223,695 B1 | 5/2001 | Edwards et al. | |
| 6,237,533 B1 | 5/2001 | Rodriguez | |
| 6,237,534 B1 | 5/2001 | Schwartz | |
| 6,237,972 B1 | 5/2001 | Jung | |
| 6,257,473 B1 | 7/2001 | Ringelstetter | |
| 6,260,895 B1 | 7/2001 | Nichols | |
| 6,305,322 B1 | 10/2001 | Patel | |
| 6,314,917 B1 * | 11/2001 | Ryan | 119/796 |
| D453,067 S | 1/2002 | Cody | |
| 6,386,606 B1 | 5/2002 | Marshall | |
| D458,024 S | 6/2002 | Tyler | |
| 6,439,627 B1 | 8/2002 | Devane | |
| 6,446,903 B1 | 9/2002 | Bazan | |
| 6,505,578 B1 | 1/2003 | Scott et al. | |
| 6,554,335 B1 | 4/2003 | Kelly et al. | |

(Continued)

*Primary Examiner* — Paul T Chin
(74) *Attorney, Agent, or Firm* — Stout, Uxa, Buyan & Mullins, LLP; Donald E. Stout

(57) ABSTRACT

A pet leash and waste pick-up device comprises a retractable waste pick-up tool which is conveniently disposed in a sheath housing compartment on the leash device. When it is necessary to pick up and dispose of pet waste, the tool is removed from the sheath housing, expanded to a usable orientation, and fitted with a plastic waste bag. The device is then maneuvered so that the center of the bag is positioned over the waste to be removed. At this point, the tool is retracted, thereby closing the bag over the waste. The bag can then be simply removed from the tool, sealed appropriately, and stored for disposal, without risk of the user directly contacting the waste.

11 Claims, 10 Drawing Sheets

U.S. PATENT DOCUMENTS

| | | |
|---|---|---|
| 6,641,188 B2 | 11/2003 | Arceo |
| 6,758,880 B1 | 7/2004 | Rhodes |
| 7,044,080 B2 | 5/2006 | Rabello |
| 7,093,869 B2 | 8/2006 | Jung |
| 7,194,982 B2 * | 3/2007 | Edwards .................. 119/796 |
| 7,992,907 B1 * | 8/2011 | DeJesus ................... 294/1.4 |
| 2002/0043810 A1 | 4/2002 | Dooley |
| 2002/0139803 A1 | 10/2002 | Demeur et al. |
| 2002/0140240 A1 | 10/2002 | Charette |
| 2002/0175197 A1 | 11/2002 | Cummins |
| 2002/0185874 A1 | 12/2002 | Arceo |
| 2003/0011203 A1 | 1/2003 | Rincon Uribe |
| 2003/0037733 A1 | 2/2003 | Benedettini |
| 2003/0085581 A1 | 5/2003 | Jemison |
| 2004/0124646 A1 | 7/2004 | Peko |
| 2004/0164568 A1 | 8/2004 | Diehl |
| 2004/0174026 A1 | 9/2004 | Sampaio |
| 2004/0189026 A1 | 9/2004 | Denham et al. |
| 2004/0222650 A1 | 11/2004 | Colesanti et al. |
| 2004/0231029 A1 | 11/2004 | Kouri |
| 2005/0006914 A1 | 1/2005 | Turner |
| 2005/0082854 A1 | 4/2005 | Barr |
| 2005/0264016 A1 * | 12/2005 | Davis ...................... 294/1.3 |
| 2006/0027190 A1 | 2/2006 | Hsu |
| 2006/0157994 A1 | 7/2006 | Anderson |
| 2006/0162675 A1 | 7/2006 | Ghalebi et al. |
| 2006/0180608 A1 | 8/2006 | Edwards |
| 2009/0095225 A1 * | 4/2009 | O'Connell ................. 119/795 |
| 2009/0200812 A1 * | 8/2009 | Mambru ................... 294/1.4 |

* cited by examiner

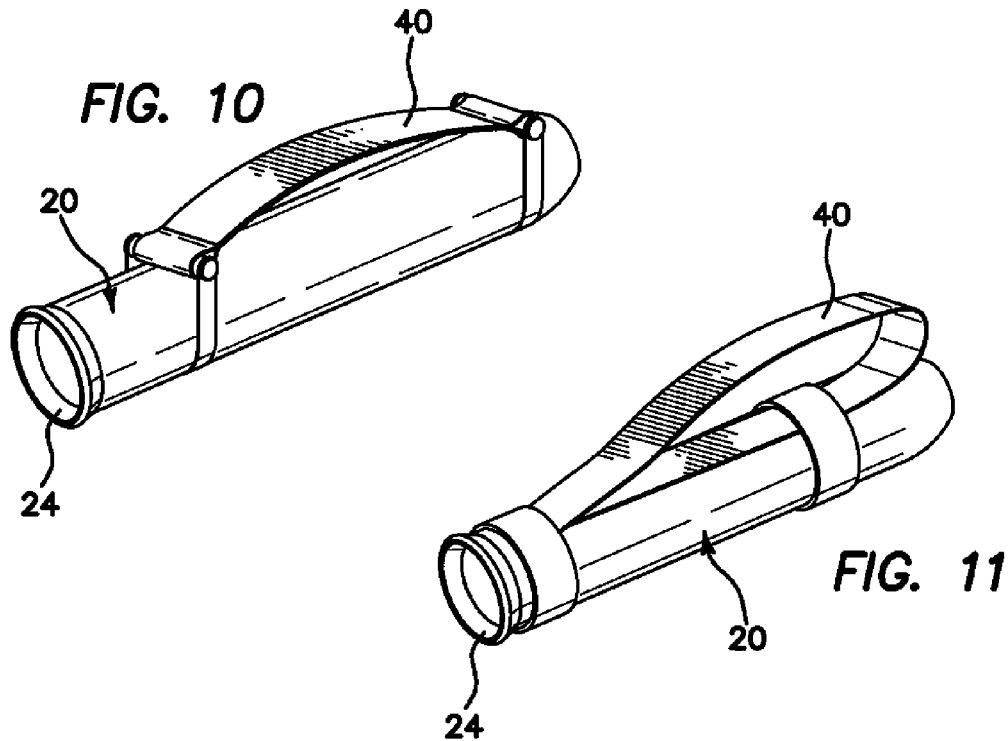
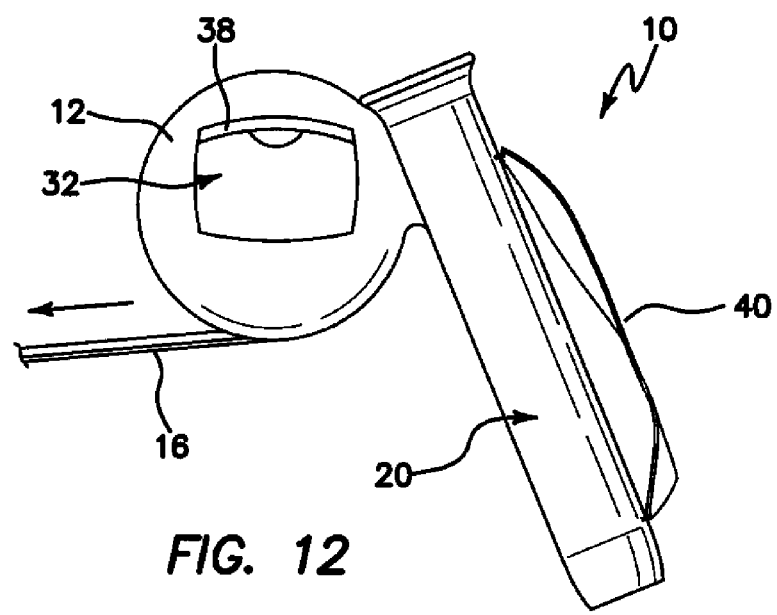

PET LEASH AND WASTE PICK-UP DEVICE

BACKGROUND OF THE INVENTION

This invention is related to the field of pet care, and, more particularly, to the fields of pet leashes and pet waste collection and disposal.

An indispensable tool for pet care, and particularly for dog care, is a restraining leash. Leash laws proliferate in most localities in order to minimize the nuisance and danger of loose pets. Increasingly, animal waste collection laws are also becoming the norm, which generally require a pet owner to collect and properly dispose of all solid pet waste which is generated off of the owner's own private property. Accordingly, any pet owner who is walking his/her dog through their neighborhood must take appropriate measures to ensure that any pet droppings are collected and disposed of in a proper manner.

The current state of the art for leash devices is a retractable leash which comprises a plastic housing for containing a coiled leash. The housing also includes a handle feature. An example of this type of leash is disclosed in U.S. Pat. No. 5,887,550, herein expressly incorporated by reference, although the flashlight disclosed in the '550 patent is not a typical feature of such leashes.

The current state of the art for pet waste collection is a plastic bag, which the pet owner carries along during a walk. When the pet defecates, the solid waste is collected by the pet owner in the bag. The bag is tied off, and the pet owner carries the bag to the next available waste can. Such an approach is generally effective, but is undesirable, and often unsanitary, as there is often a small hole in the bag or other problem which causes the owner's hand to inadvertently contact the waste.

Numerous prior art approaches to this problem have been proposed, none of which has been entirely successful. For example, some leash housings now include a compartment for storing the bags, both empty and filled, so that the owner does not have to carry the bag on his/her person. Other approaches include a device for hanging the filled bag from the leash housing a hook or the like. Various scoops for picking up the waste have also been proposed. However, none of these approaches have gained wide acceptance as a desirable solution to the problem.

SUMMARY OF THE INVENTION

The present invention addresses the concerns identified above by providing a pet leash and waste pick-up device which comprises a retractable waste pick-up tool which is conveniently disposed in a sheath housing compartment on the leash device. When it is necessary to pick up and dispose of pet waste, the tool is removed from the sheath housing, expanded to a usable orientation, and fitted with a plastic waste bag. The device is then maneuvered so that the center of the bag is positioned over the waste to be removed. At this point, the tool is retracted, thereby closing the bag over the waste. Now, the bag can be conveniently removed from the tool, sealed appropriately, and stored for disposal, without risk of the user directly contacting the waste.

More particularly, there is provided a pet leash and sanitary device, which comprises a fixation member and a leash extendable from the fixation member. A sheath is attached to the fixation member, having a hollow interior portion and an opening for accessing the hollow interior portion. A waste pick-up tool is provided in conjunction with the pet leash and sanitary device, which comprises a plurality of hinged arms and an actuator for moving the hinged arms between a retracted and an expanded orientation. The waste pick-up tool is storable in the hollow interior portion of the sheath when in its retracted orientation.

Advantageously, a closure is provided for the sheath access opening, to prevent the waste pick-up tool from accidentally falling out of the sheath. In one embodiment, the fixation member comprises an anchor, and the leash is fixed in length. In another embodiment, the fixation member comprises a housing, and the leash is extendable and retractable, and is storable within the housing when in a retracted condition.

The waste pick-up tool actuator, in a preferred embodiment, comprises a pull member and a rod having a distal end and a proximal end. The pull member is attached to the proximal end of the rod. An engagement member is attached to the distal end of the rod. The engagement member is attached to a proximal end of each of the hinged arms. Each one of the plurality of hinged arms comprises a link, a cam, and an arm end. Each of the arm ends, in the expanded orientation, are arranged to function together to receive a waste bag pulled thereover. When the waste pick-up tool is moved to its retracted orientation, with a waste bag in place over the arm ends, the waste bag is drawn to a closed orientation so that it may be conveniently sealed by a user.

Advantageously, in order to assist the user when walking a pet at night, the device may further comprise a light affixed thereto.

In some embodiments of the invention, the sheath may be integrally constructed, preferably of molded plastic, with the remainder of the leash housing. However, in order to adapt the invention to existing leashes, the sheath for storing the waste pick-up tool may alternatively be removably attachable to the fixation member. In preferred embodiments, this removable attachment is accomplished by the use of hook and loop fasteners.

A compartment may also be disposed on the leash and waste pick-up device for containing one or more flexible waste bags.

In another aspect of the invention, there is provided a pet waste pick-up tool, which comprises a plurality of hinged arms and an actuator for moving the hinged arms between a retracted and an expanded orientation. The actuator comprises a pull member and a rod having a distal end and a proximal end. The pull member is attached to the proximal end of the rod and an engagement member is attached to the distal end of the rod. The engagement member is, in turn, attached to a proximal end of each of the hinged arms.

Each one of the plurality of hinged arms comprises a link, a cam, and an arm end. Each of the arm ends, in the expanded orientation, are arranged to function together to receive a waste bag pulled thereover. When the waste pick-up tool is moved to its retracted orientation, with a waste bag in place over the arm ends, the waste bag is drawn to a closed orientation so that it may be conveniently sealed by a user.

In yet another aspect of the invention, there is disclosed a method of picking up and disposing of pet waste while walking a pet on a leash device. The inventive method comprises steps of observing pet waste to be cleaned up, opening a compartment disposed in an interior cavity on the leash device, and removing a waste pick-up tool from the interior cavity. The waste pick-up tool is then expanded from a retracted orientation to an expanded orientation. A flexible waste bag is placed over a plurality of hinged arms disposed on the waste pick-up tool and pushing a center portion of the bag into an open area defined by the plurality of expanded arms.

Once the plastic bag is in place over the target waste, the pick-up tool and bag combination is moved so that the bag is disposed over waste to be picked up. The waste pick-up tool is then actuated to retract the arms to a closed orientation, thereby closing the bag about the waste. The bag is then removed from the hinged arms and sealed, after which the retracted waste pick-up tool is placed back into the interior cavity.

The invention, together with additional features and advantages thereof, may best be understood by reference to the following description taken in conjunction with the accompanying illustrative drawing.

BRIEF DESCRIPTION OF THE DRAWINGS

FIG. 10 is a perspective view of a modified sheath embodiment;

FIG. 11 is a perspective view similar to FIG. 10 of still another modified sheath embodiment;

FIG. 12 is a view of another modified leash and waste pick-up embodiment, in accordance with the principles of the present invention;

DESCRIPTION OF THE PREFERRED EMBODIMENTS

Figure 1:
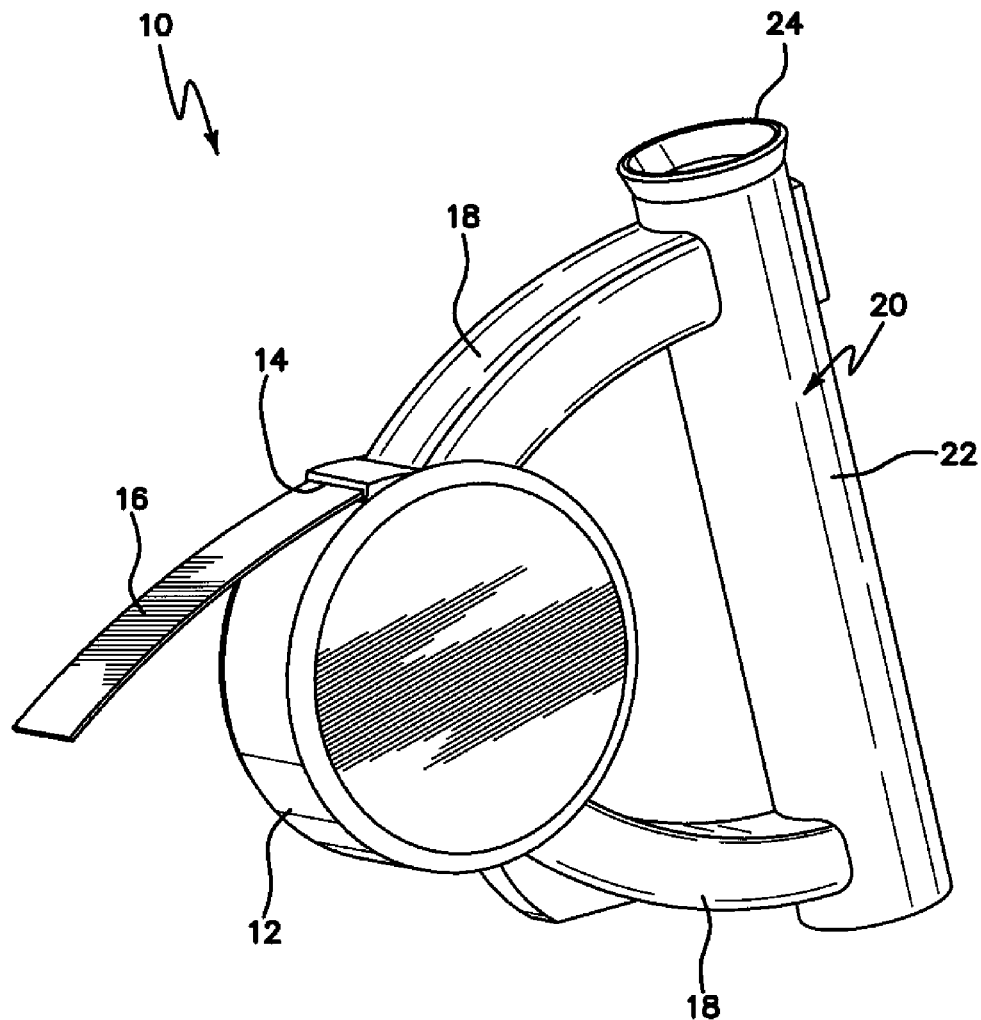
FIG. 1 is a view of one embodiment of the present invention.

Referring now more particularly to the drawings, there is shown in FIGS. 1-6 and 12-14 various embodiments of a pet leash and waste pick-up device 10 constructed in accordance with the present invention. In FIG. 1 is shown a first embodiment comprising a leash housing 12 having an opening 14 through which a length of leash 16 may be extended or retracted. Retractable leashes of this type are well known in the art, and this aspect of the inventive device is conventional. A handle 18 is connected to the leash housing 12 for permitting a user to hold the leash. The user may also conveniently hold the leash device by gripping the sheath 20.

Integrated into the leash and waste pick-up device 10 is a sheath 20, which comprises a hollow housing 22 and a removable closure 24, for selectively closing an opening in the housing 22. The sheath 20 is adapted for containing a waste pick-up device, which will be described hereinbelow. It may also be adapted for containing a supply of plastic bags which the user may employ for containing pet waste picked up by the pick-up device.

Figure 2:
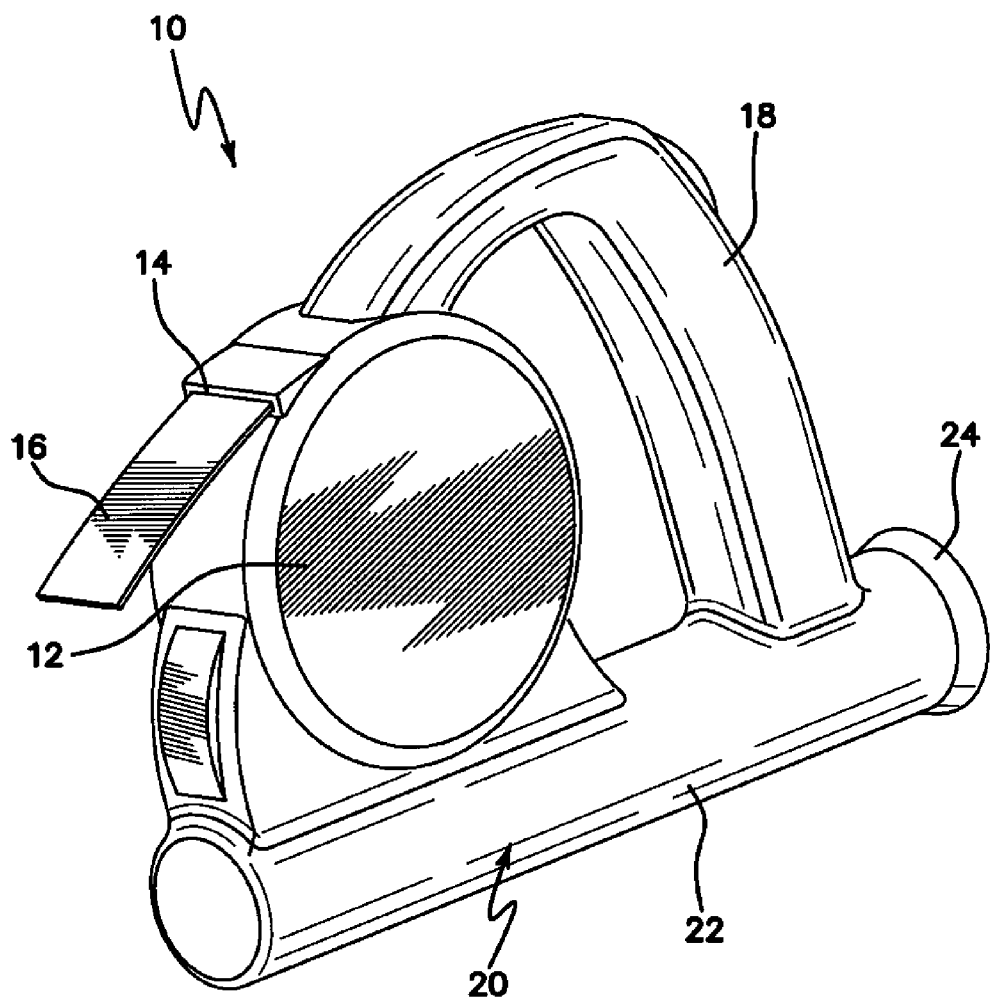
FIG. 2 is a view of a modified embodiment of the present invention.

The embodiment of FIG. 2 is similar in many respects to that of FIG. 1, but employs a somewhat more compact and integrated design. Like elements to those of the FIG. 1 embodiment are denoted by like reference numerals.

Figure 3:
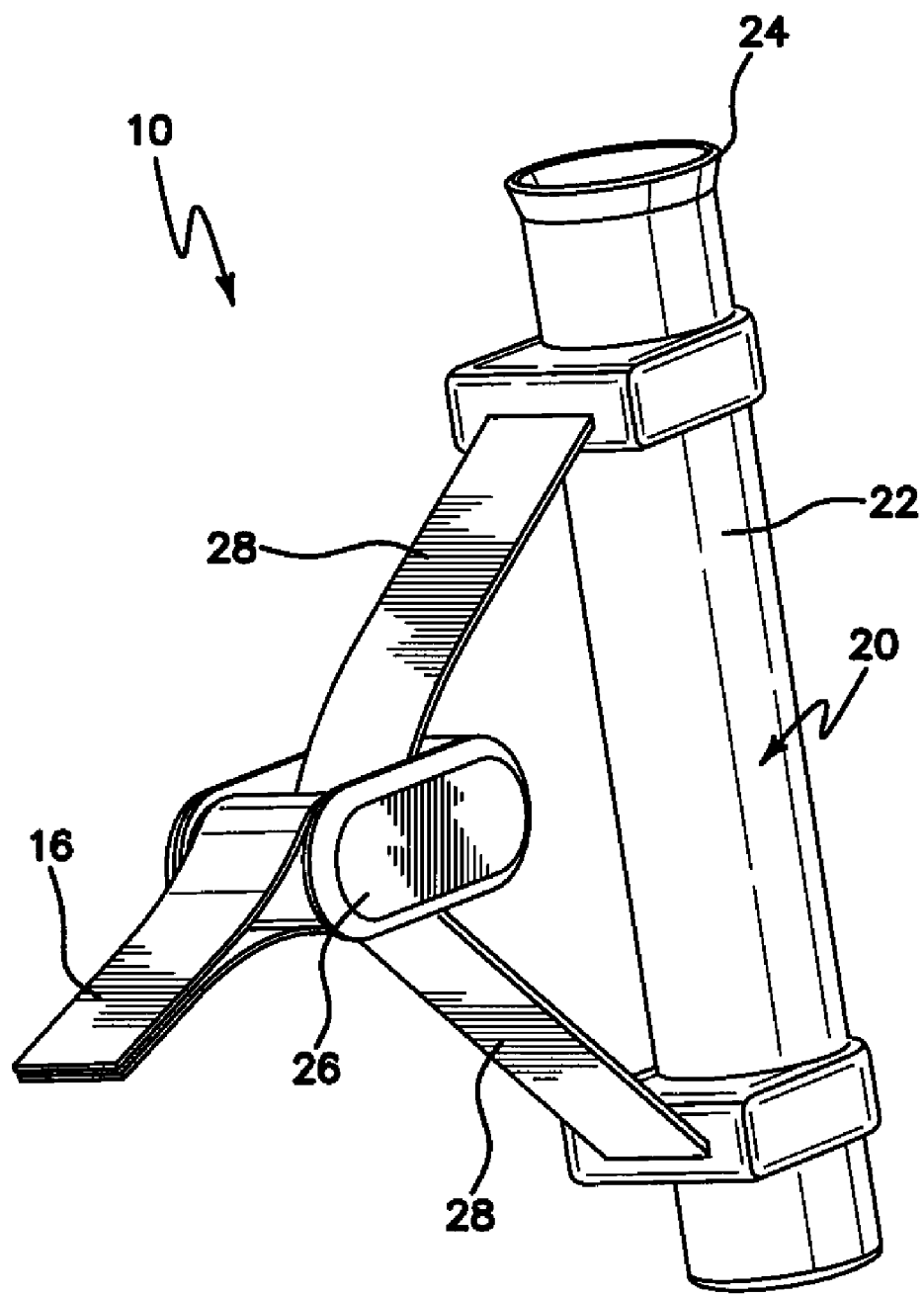
FIG. 3 is a view of yet another modified embodiment of the present invention.

In FIG. 3, there is shown a further modified embodiment, wherein the leash length is fixed. In this embodiment, wherein like elements to those in prior embodiments are denoted by like reference numerals, the leash 16 is secured to an anchor ring 26, which is, in turn, secured to the sheath 20 by means of straps 28 or suitable alternatives.

Figure 4:
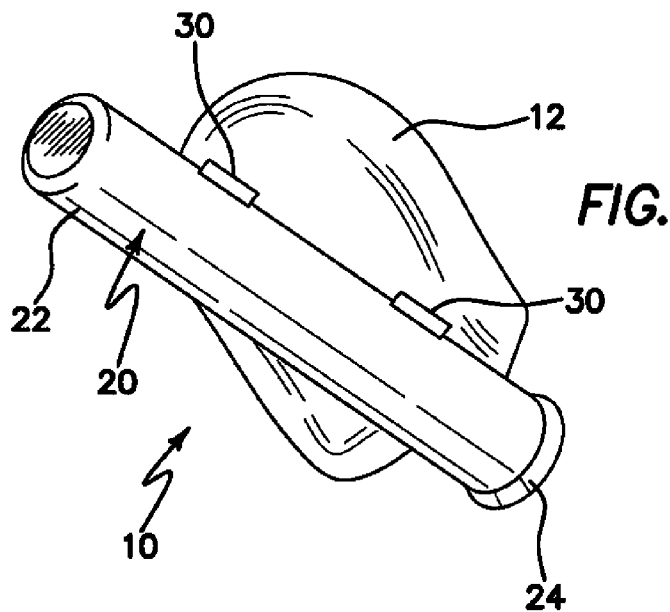
FIG. 4 is a view of yet another modified embodiment of the present invention, wherein an existing pet leash is modified to incorporate the features of the invention.

FIG. 4 illustrates an alternative embodiment, wherein a sheath 20 constructed in accordance with the principles of the present invention may be conveniently attached to the housing 12 of an existing leash. Thus, the innovative advantages of the present invention may be adapted for use with leashes already owned by a prospective user. Any suitable means for securing the sheath 20 to the housing 12 may be used. Illustrated is the use of VELCRO® hook and loop or foam tape fasteners 30 for creating the attachment. Advantageously, using such an easily releasable securing means permits a pet owner to conveniently utilize a single sheath 20 with a plurality of different leashes at different times.

Figure 5:
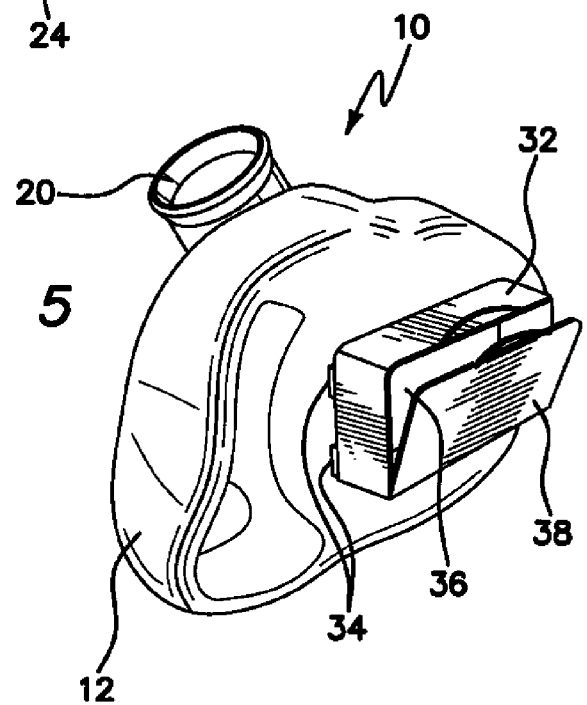
FIG. 5 is a perspective view of a leash device to which has been secured a container for storing waste bags.
Figure 6:
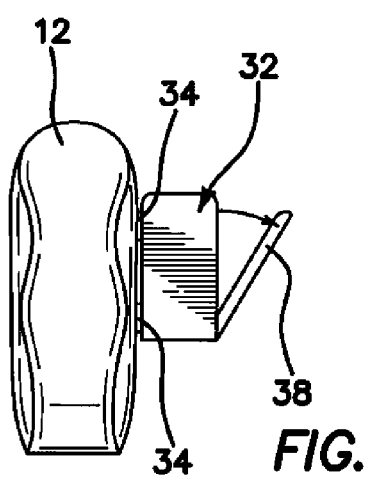
FIG. 6 is an end view of the leash device of FIG. 5.

FIGS. 5 and 6 illustrate a leash housing 12, which may be a prior art leash such as that shown in FIG. 4, which is attached to a sheath 20, and to which is also attached a container 32 for storing plastic bags or other suitable receptacles for pet waste. Like the sheath 20, the container 32 may be integrally molded with the leash housing 12, or may alternatively be removably attached thereto, so that it may be used with conventional leashes. If the container 32 is removably attached to the housing, it may be attached by means similar to those used to attach the sheath to the housing in the FIG. 4 embodiment, Thus, VELCRO® hook and loop fasteners 34 are illustrated for releasably attaching the container 32 to the housing 12. As illustrated, the container 32 may have either a top or side opening for accessing the interior 36 of the container, where the bags (not shown) are stored, and that opening may be closed by means of a hinged lid 38 or the like.

Figure 7:
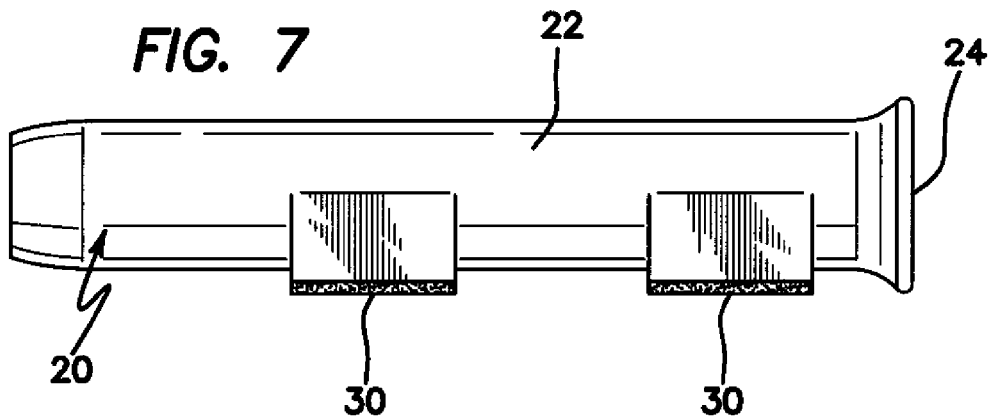
FIG. 7 is a side view of a sheath for use with the embodiment of FIG. 4.
Figure 8:
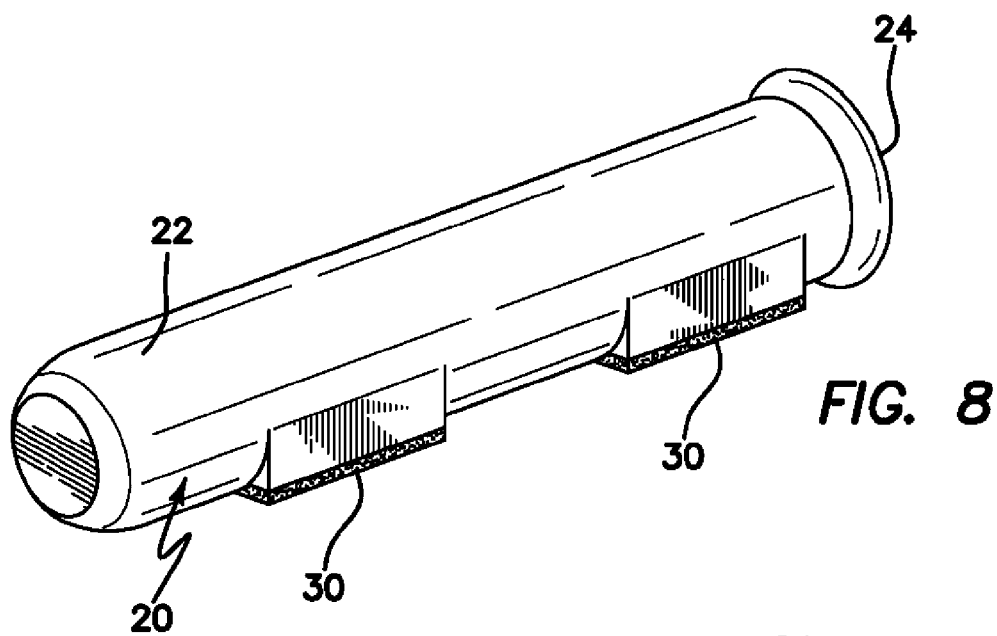
FIG. 8 is a perspective view of the sheath of FIG. 7.
Figure 9:
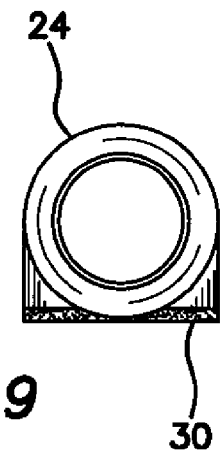
FIG. 9 is an end view of the sheath of FIGS. 7 and 8.

FIGS. 7-9 illustrate, in isolation, a typical sheath 20 which may be employed in connection with the present invention, as shown in FIGS. 1-5.

The inventive sheath 20 of the present invention may also be employed separately from the leash. For example, FIGS. 10 and 11 illustrate two variations of an embodiment of the sheath 20 which incorporate straps 40 or other suitable handles. The straps 40 provide a convenient means for a user to carry the sheath with him/her in order to have ready access to the waste pick-up tool and/or bags contained therein, while the pet is either on or off leash. The sheath, of course, may also be stored in the user's pocket, in which case the straps 40 may not be necessary.

Figure 13:
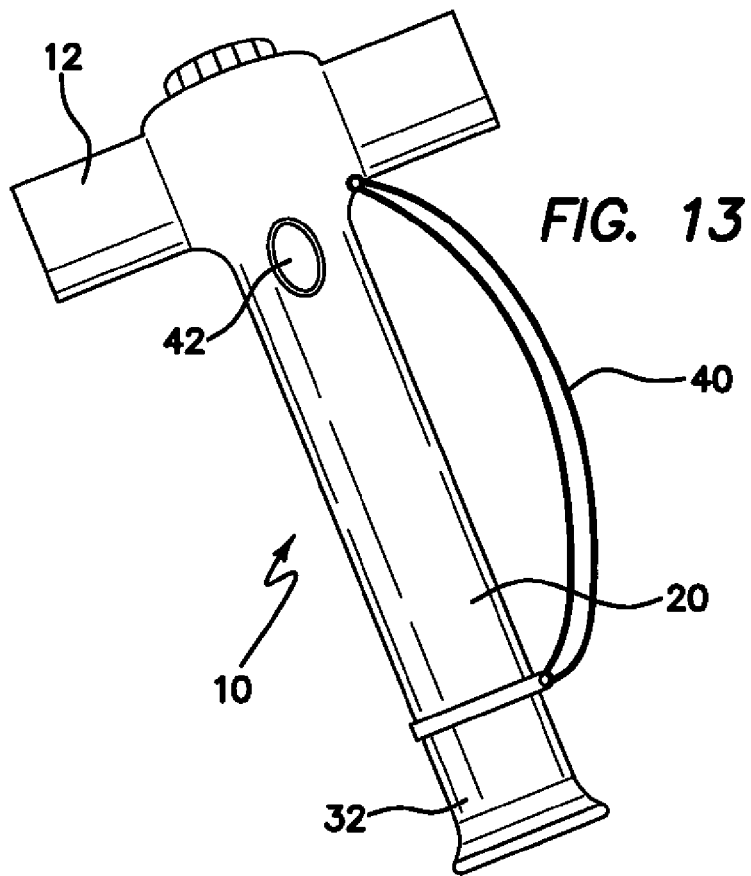
FIG. 13 is a view of still another modified leash and waste pick-up embodiment according to the invention.
Figure 14:
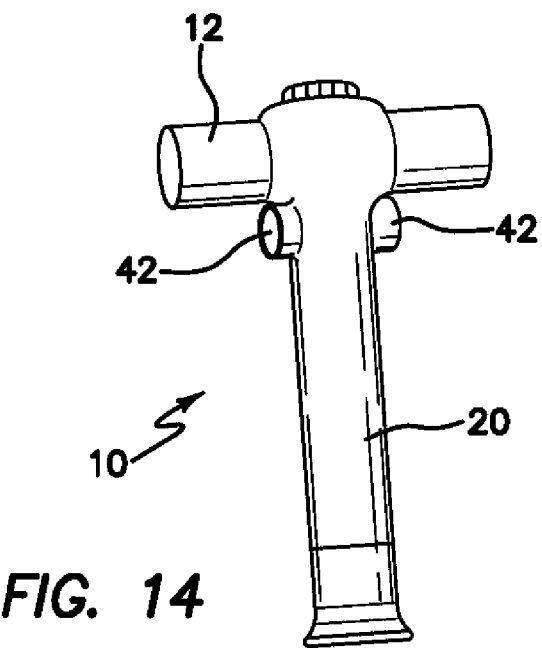
FIG. 14 is a rear view of the embodiment of FIG. 13.

In FIGS. 12-14, there are shown three further embodiments of the inventive device 10, which are of a generally "gun-type" configuration. In these embodiments, like elements to those shown in prior embodiments are denoted by like reference numerals. Again, the leash housing 12 is adapted for containing a retractable leash 16, and may have disposed thereon a container 32 for holding one or more plastic bags or other suitable pet waste receptacles. The sheath 20 is connected to the leash housing in a "gun-type" fashion, with the sheath serving as the handle for holding the device 10. A strap 40 may be attached to the sheath 20, if desired. A button 42 may be provided at the junction between the leash housing and the sheath for releasing/locking the leash reel within the housing 12.

The embodiments of FIGS. 13 and 14 are similar in concept to that of FIG. 12. Of note, a container 32 for one or more bags may be disposed on the end of the sheath 20, as shown in FIG. 13.

Figure 15:
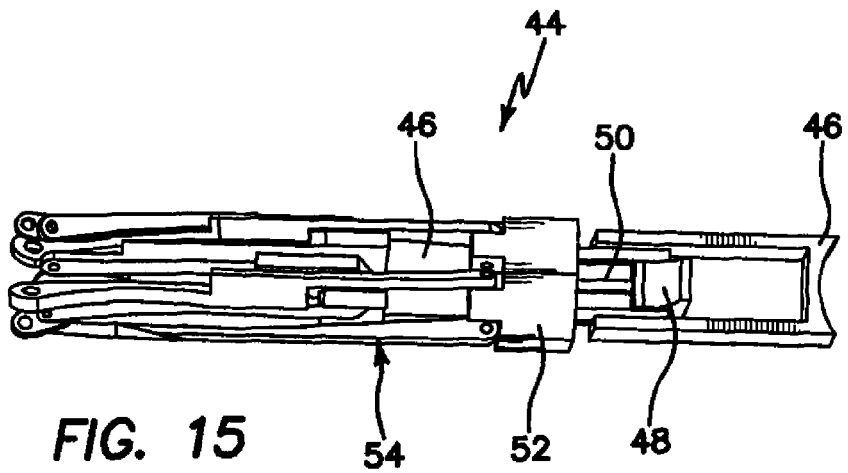
FIG. 15 is a side view of a mechanical waste pick-up device constructed in accordance with the principles of the present invention.
Figure 16:
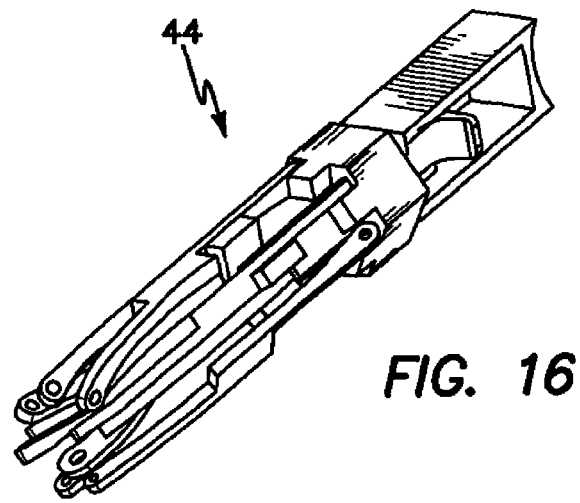
FIG. 16 is a perspective view of the device of FIG. 15.
Figure 17:
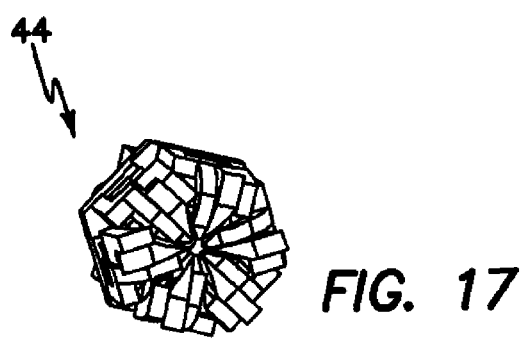
FIG. 17 is an end view, showing the distal end of the device of FIGS. 15 and 16.
Figure 18:
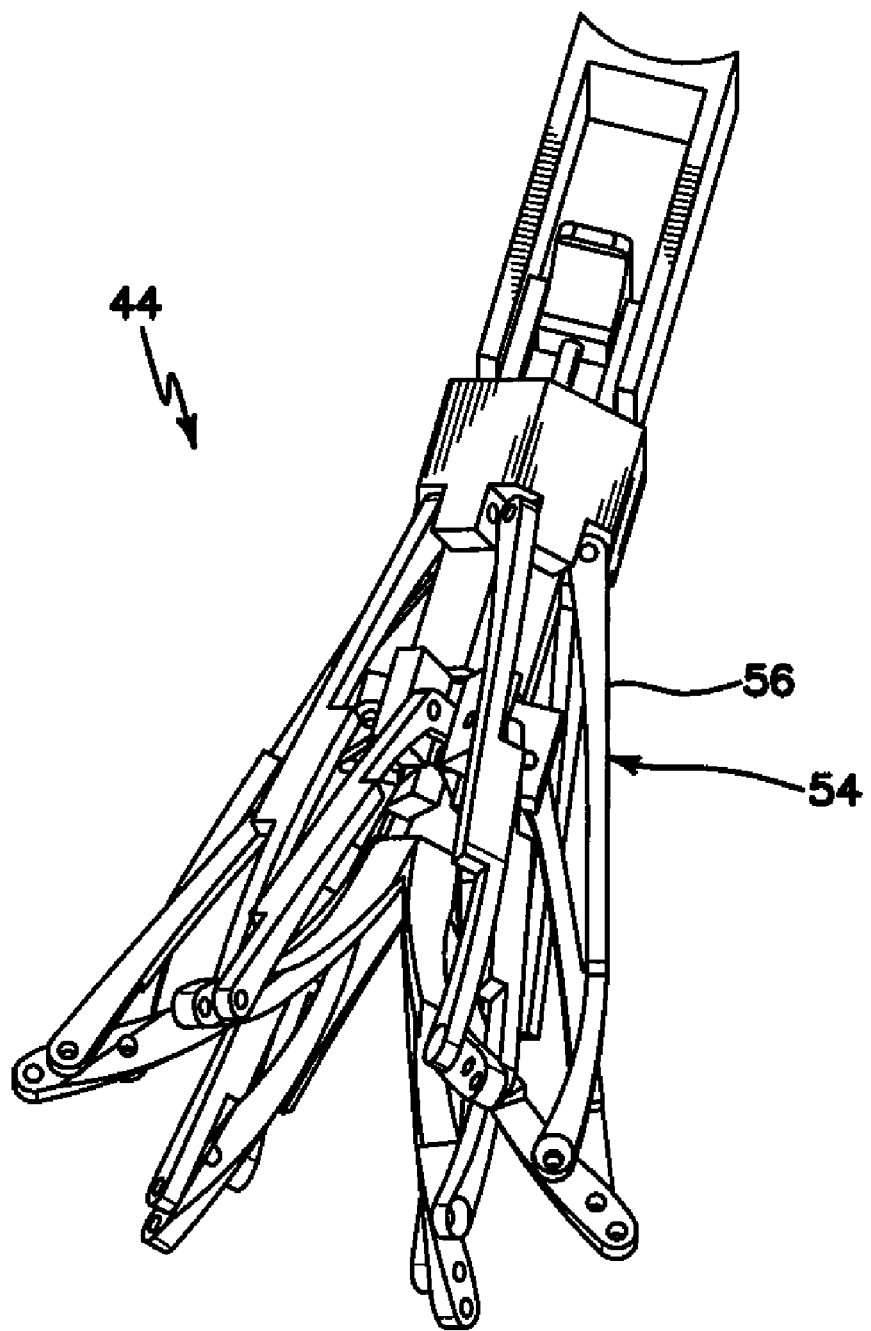
FIG. 18 is a perspective view of the device of FIGS. 15-17, showing the device in an expanding configuration.

FIGS. 15-19 illustrate a waste pick-up tool 44 which is constructed in accordance with the principles of the current invention. As shown, the tool 44 is compact, relatively simple in construction, and convenient for storage in the aforementioned sheath 20, as well as easy to use in conjunction with a waste receptacle bag to ensure that waste is picked up and sealed in the bag without inadvertent contact by the waste with the user's body. The tool 44 comprises a core 46 having a pull member 48 which is connected to a rod 50. The rod is connected, in turn, to an outside member or engagement member 52. The engagement member 52 is adapted to support a plurality of hinged arms 54 which each comprise a link 56, a cam 58, and an arm end 60. As shown in FIGS. 15-17, the tool 44 may be configured to a retracted position, for storage and transport, wherein, for example, it may be conveniently stored in the sheath 20, and it may also be configured to an expanded position, as shown, progressively, in FIGS. 18 and 19, for use.

In addition to the foregoing features, it is noted that a light, such as an ordinary flashlight or LED may be incorporated into any of the foregoing described embodiments. For example, the light may be disposed within the sheath 20. A light may also be incorporated within the pick-up tool 44, so that a user may have better visibility for the task at hand when it is dark.

Figure 19:
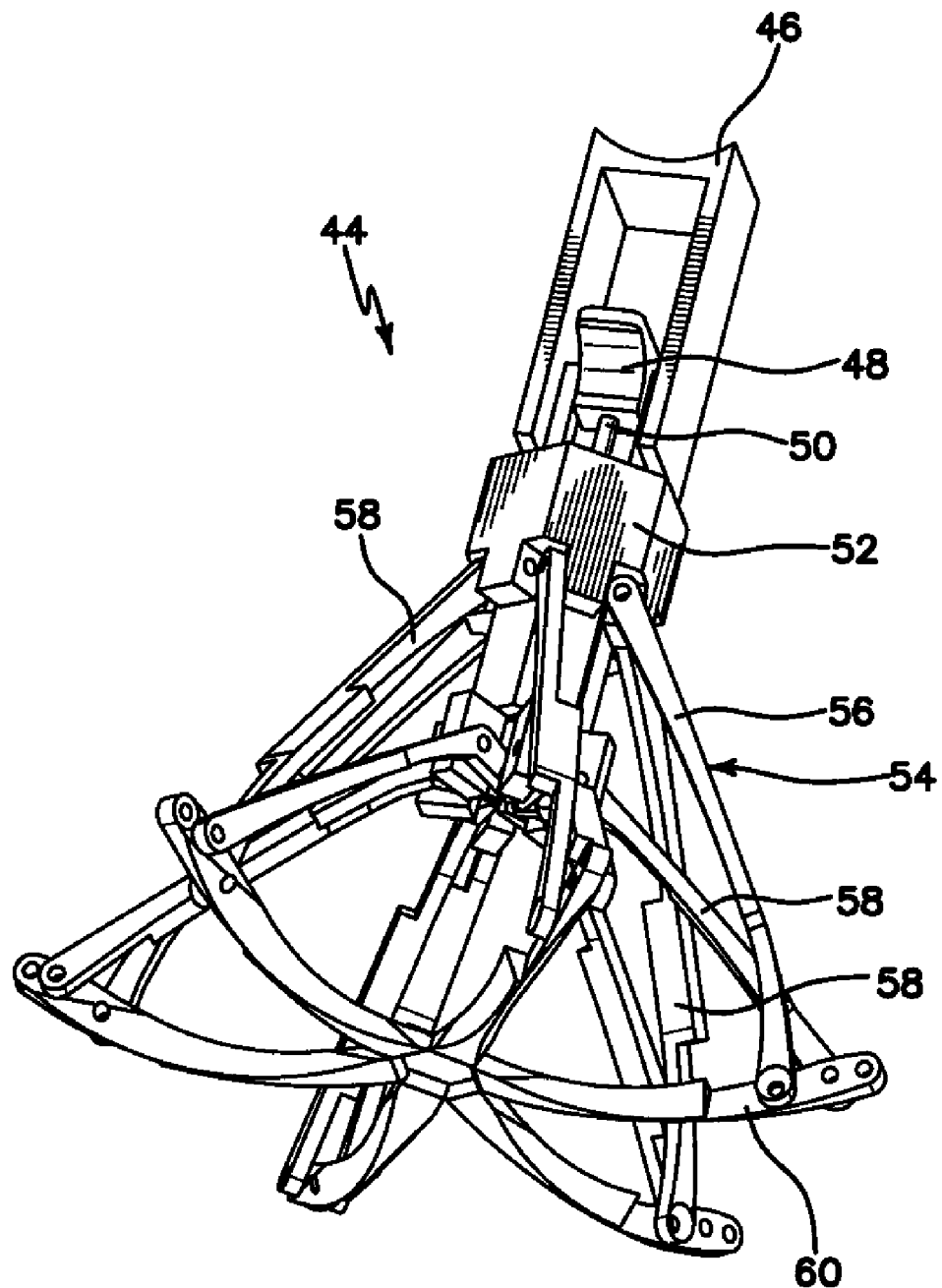
FIG. 19 is a view similar to FIG. 18, wherein the pick-up device has been fully expanded for receiving pet waste.

In operation, as noted above, the pick-up device 44 is stored in the sheath 20. It may be removed therefrom by grasping a thumb rest on the sheath and pulling the tool outwardly. As the device exits the sheath 20, a spring disposed therein causes the device to expand from its retracted orientation (FIGS. 15-17) to its expanded orientation (FIG. 19). Alternatively, the spring may be dispensed with and the user may manually extend the device to its expanded orientation. The user then obtains a plastic bag, either from his/her pocket or from the above described storage compartments in the sheath or attached to the leash, and is placed over the arm ends 60 of the pick-up device 44. The center of the bag is pushed into the open area inside of the arms.

At this juncture, the pull member 48 is actuated upwardly to cause force to be applied and translated through the links and rod to the arm ends and arm cams. As the arms move inwardly responsive to this force, toward the center of the device, the joint between each arm and arm end is locked in an open position. The arm ends 60 thus close around the waste to be picked up as more force is applied, thereby eventually grasping the waste.

Now, thumb and finger force on the pull member is relaxed, thus allowing the spring force to move the arms outwardly. This action allows additional collection to occur.

Once all of the desired waste has been collected, the movable arms are positioned in the closed orientation to contain the waste. The plastic bag ends are then pulled over the ends of the arms. The outside edge of the plastic bag are then drawn closed, and the bag may be sealed, if desired, to prevent the waste from escaping and to minimize odor. At this point, the bag can be safely removed from the device 44 and placed into a trash can or stored for later disposal.

Once the plastic bag is removed from the pick-up device 44, the device may be collapsed to its retracted orientation, and stored in the sheath 20.

Accordingly, although an exemplary embodiment of the invention has been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A pet leash and sanitary device, comprising:
   a fixation member;
   a leash extendable from said fixation member;
   a sheath attached to said fixation member, having a hollow interior portion and an opening for accessing said hollow interior portion; and
   a waste pick-up tool, comprising a plurality of hinged arms and an actuator for moving said hinged arms between a retracted and an expanded orientation;
   said waste pick-up tool being storable in said hollow interior portion of said sheath when in its retracted orientation,
   wherein said waste pick-up tool actuator comprises:
   a pull member;
   a rod having a distal end and a proximal end, said pull member being attached to the proximal end of said rod; and
   an engagement member attached to the distal end of said rod;
   wherein said engagement member is attached to a proximal end of each of said hinged arms, and wherein each one of said plurality of hinged arms comprises a link, a cam, and an arm end.

2. The device as recited in claim 1, and further comprising a closure for said sheath access opening.

3. The device as recited in claim 1, wherein said fixation member comprises an anchor.

4. The device as recited in claim 1, wherein said fixation member comprises housing.

5. The device as recited in claim 1, wherein said leash is extendable and retractable, and is storable within said housing when in a retracted condition.

6. The device as recited in claim 1, wherein each of said arm ends, in said expanded orientation, are arranged to function together to receive a waste bag pulled thereover.

7. The device as recited in claim 6, wherein when said waste pick-up tool is moved to its retracted orientation, with a waste bag in place over said arm ends, the waste bag is drawn to a closed orientation so that it may be conveniently sealed by a user.

8. The device as recited in claim 1, wherein said sheath is removably attachable to said fixation member.

9. The device as recited in claim 8, and further comprising hook and loop fasteners for removably attaching said sheath to said fixation member.

10. The device as recited in claim 1, wherein said sheath is integrally constructed with said fixation member.

11. The device as recited in claim 1, and further comprising a compartment disposed on said device for containing a flexible waste bag.

* * * * *